United States Patent
Chou et al.

(10) Patent No.: US 12,461,765 B2
(45) Date of Patent: Nov. 4, 2025

(54) CONTAINER NAME IDENTIFICATION PROCESSING

(71) Applicant: INTERNATIONAL BUSINESS MACHINES CORPORATION, Armonk, NY (US)

(72) Inventors: Kuo-Liang Chou, New Taipei (TW); Zhan Peng Huo, Beijing (CN); Jun Zhu, Shanghai (CN); Yu Zui You, Beijing (CN); Xuan Feng, Beijing (CN); Jun Hao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 130 days.

(21) Appl. No.: 18/063,736

(22) Filed: Dec. 9, 2022

(65) Prior Publication Data
US 2024/0192950 A1    Jun. 13, 2024

(51) Int. Cl.
  G06F 9/455    (2018.01)
  G06F 8/36     (2018.01)
  G06F 8/71     (2018.01)

(52) U.S. Cl.
  CPC ............. *G06F 9/455* (2013.01); *G06F 8/36* (2013.01); *G06F 8/71* (2013.01)

(58) Field of Classification Search
  CPC .... G06F 8/36; G06F 8/71; G06F 11/36–3696; G06F 9/455–45558; G06F 2009/45562–45595; G06F 11/3698
  See application file for complete search history.

(56) References Cited

U.S. PATENT DOCUMENTS

| 9,355,248 B1 | 5/2016 | Wiest et al. |
| 10,169,347 B2 | 1/2019 | Jayachandran et al. |
| (Continued) | | |

FOREIGN PATENT DOCUMENTS

| CN | 111124612 A | 5/2020 |
| CN | 111522627 A | 8/2020 |
| CN | 112395042 A | 2/2021 |

OTHER PUBLICATIONS

Kherywala, S., et al., "Dive—Analyzer Docker Images", gochronicles [online], Aug. 12, 2021 [retrieved Jun. 13, 2024], Retrieved from Internet: <URL: https://gochronicles.com/dive/>, whole document.*

(Continued)

*Primary Examiner* — Todd Aguilera
(74) *Attorney, Agent, or Firm* — Aaron Pontikos, Esq; Kevin P. Radigan, Esq.; Heslin Rothenberg Farley & Mesiti P.C.

(57) ABSTRACT

Processing within a container-based computing environment is facilitated by standardizing container identification processing. The process includes, for a container being provided from a container image, extracting multiple layer files from the container image and using natural language processing to determine frequency of occurrence of software components in the multiple layer files of the container image. Further, the process includes generating a container name for the container using the determined frequency of occurrence of software components in the multiple layer files of the container image. The method further includes providing the container for the container-based computing environment using the container image and the generated container name. The generated container name facilitates processing within the container-based computing environment by being based, at least in part, on the frequency of (Continued)

occurrence of software components in the multiple layer files of the container image.

20 Claims, 11 Drawing Sheets

(56) References Cited

U.S. PATENT DOCUMENTS 10,659,329 B1 * 5/2020 Zhao ..................... H04L 43/08
2022/0222105 A1 7/2022 Sedayao et al.

OTHER PUBLICATIONS

Agarwal, R., "Default container names in Docker", Medium [online], Nov. 14, 2021 [retrieved Jun. 15, 20245], Retrieved from Internet: <URL: https://agarwalrounak.medium.com/default-container-names-in-docker-15bdbf56b539>, pp. 1-5.*

Anonymous, Model Training, C3.ai [online], 2021 [retrieved Jun. 20, 2025], Retrieved from Internet: <URL: https://web.archive.org/web/20210415142341/https://c3.ai/glossary/data-science/model-training/>, whole document.*

Testcontainers.com, "Image Name Substitution", https://www.testcontainers.org/features/image_name_substitution/, downloaded Sep. 15, 2022 (6 pages) (Year: 2022).

* cited by examiner

A special hierarchical tree - component final weight calculation score table

| Level | Classification 1 | Classification 2 | Calculation Element Name | Abbreviation | Score |
|---|---|---|---|---|---|
| 1 | Language A | / | Language A | LgA | 0.2 |
| 1 | Language B | / | Language B | LgB | 0.3 |
| 1 | Image Name | / | Image Name | IName | 0.5 |
| 2 | Language A | Web Framework A | Web Framework A | WebFKA | 0.2 * 0.06 = 0.012 |
| 2 | Language A | Web Framework B | Web Framework B | WebFKB | 0.2 * 0.23 = 0.046 |
| 2 | Language A | Deep Learning Framework A | Deep Learning Framework A | DLFKA | 0.2 * 0.61 = 0.122 |
| 2 | Language A | Deep Learning Framework B | Deep Learning Framework B | DLFKB | 0.2 * 0.1 = 0.02 |
| 2 | Language B | Tool 1 | Tool 1 | Tl1 | 0.3 * 0.06 = 0.018 |
| 2 | Language B | Plugin 1 | Plugin 1 | Plug2 | 0.3 * 0.58 = 0.174 |
| 2 | Language B | Tool 2 | Tool 2 | Tl2 | 0.3 * 0.36 = 0.108 |
| 2 | Image Name | Part 1 | Part 1 | Prt1 | 0.5 * 0.2 = 0.1 |
| 2 | Image Name | Part 2 | Part 2 | Prt2 | 0.5 * 0.2 = 0.1 |
| 2 | Image Name | Part 3 | Part 3 | Prt3 | 0.5 * 0.2 = 0.2 |
| 2 | Image Name | Part N | Part N | PrtN | 0.5 * 0.2 = 0.1 |
| 3 | Language A | Web Framework A | Web Framework A Version 1 | WebFKAV1 | 0.2 * 0.06 * 0.11 = 0.00132 |
| 3 | Language A | Web Framework A | Web Framework A Version 2 | WebFKAV2 | 0.2 * 0.06 * 0.22 = 0.00264 |
| 3 | Language A | Web Framework A | Web Framework A Version 3 | WebFKAV3 | 0.2 * 0.06 * 0.67 = 0.00804 |
| 3 | Language A | Web Framework B | Web Framework B Version 1 | WebFKBV1 | 0.2 * 0.23 * 1 = 0.046 |
| 3 | Language A | Deep Learning Framework A | Deep Learning Framework A Version 2 | DLFKAV2 | 0.2 * 0.61 * 0.74 = 0.09028 |
| 3 | Language B | Plugin 1 | Plugin 1 Version 2 | Plug1V3 | 0.3 * 0.58 * 0.43 = 0.07482 |
| 3 | Language B | Tool 2 | Tool 2 Version 2 | Tl2V2 | 0.3 * 0.36 * 0.66 = 0.07128 |
| 3 | Image Name | Part 3 | Part 3 Version 3 | Prt3V3 | 0.5 * 0.4 * 0.5 = 0.1 |
| 3 | Image Name | Part 3 | Part 3 Version 2 | Prt3V2 | 0.5 * 0.4 * 0.5 = 0.1 |
| 3 | Image Name | Part 1 | Part 1 Version 2 | Prt1V2 | 0.5 * 0.2 * 1 = 0.1 |

FIG. 8

CONTAINER NAME IDENTIFICATION PROCESSING

BACKGROUND

One or more aspects relate, in general, to enhancing processing within a computing environment, and in particular, to standardizing container name identification processing for a container-based computing environment.

As one example, a container-based computing environment, or container-based data processing system, can be an open platform for developing, shipping and running applications in containers. At their core, such systems provide a way to run almost any application securely isolated in a container. By way of example, a container can consist of an application, user-added files, and metadata for the application. Each container can be built from an image, or container image, which can specify what the container holds, what process to run when the container is launched, and a variety of other configuration data. The container image is typically a read-only template from which the container is launched. The container image can include a series of layers, or layer files, and be built from one or more base images using a set of instructions, each of which creates a new layer or layer file in the image.

SUMMARY

Shortcomings of the prior art are overcome, and additional advantages are provided through the provision of a computer-implemented method which includes facilitating processing within a container-based computing environment by standardizing container identification processing. The facilitating processing includes, for a container being provided from a container image, extracting multiple layer files from the container image, and using natural language processing to determine frequency of occurrence of software components in the multiple layer files of the container image. Further, the facilitating processing includes generating a container name for the container using the determined frequency of occurrence of software components in the multiple layer files of the container image. Facilitating processing within the container-based computing environment further includes providing the container for the container-based computing environment using the container image and the generated container name. The generated container name facilitates processing within the container-based computing environment by being based, at least in part, on the frequency of occurrence of software components in the multiple layer files of the container image.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 8 depicts one example of a hierarchical tree data structure with software component weights, which can be determined and/or used in accordance with one or more aspects of the present invention.

DETAILED DESCRIPTION

The accompanying figures, which are incorporated in and form a part of this specification, further illustrate the present invention and, together with this detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, or tools only as examples, and not by way of limitation. Furthermore, the illustrative embodiments are described in certain instances using particular software, hardware, tools, or data processing environments only as example for clarity of description. The illustrative embodiments can be used in conjunction with other comparable or similarly purposed structures, systems, applications, or architectures. One or more aspects of an illustrative embodiment can be implemented in software, hardware, or a combination thereof.

Figure 1:
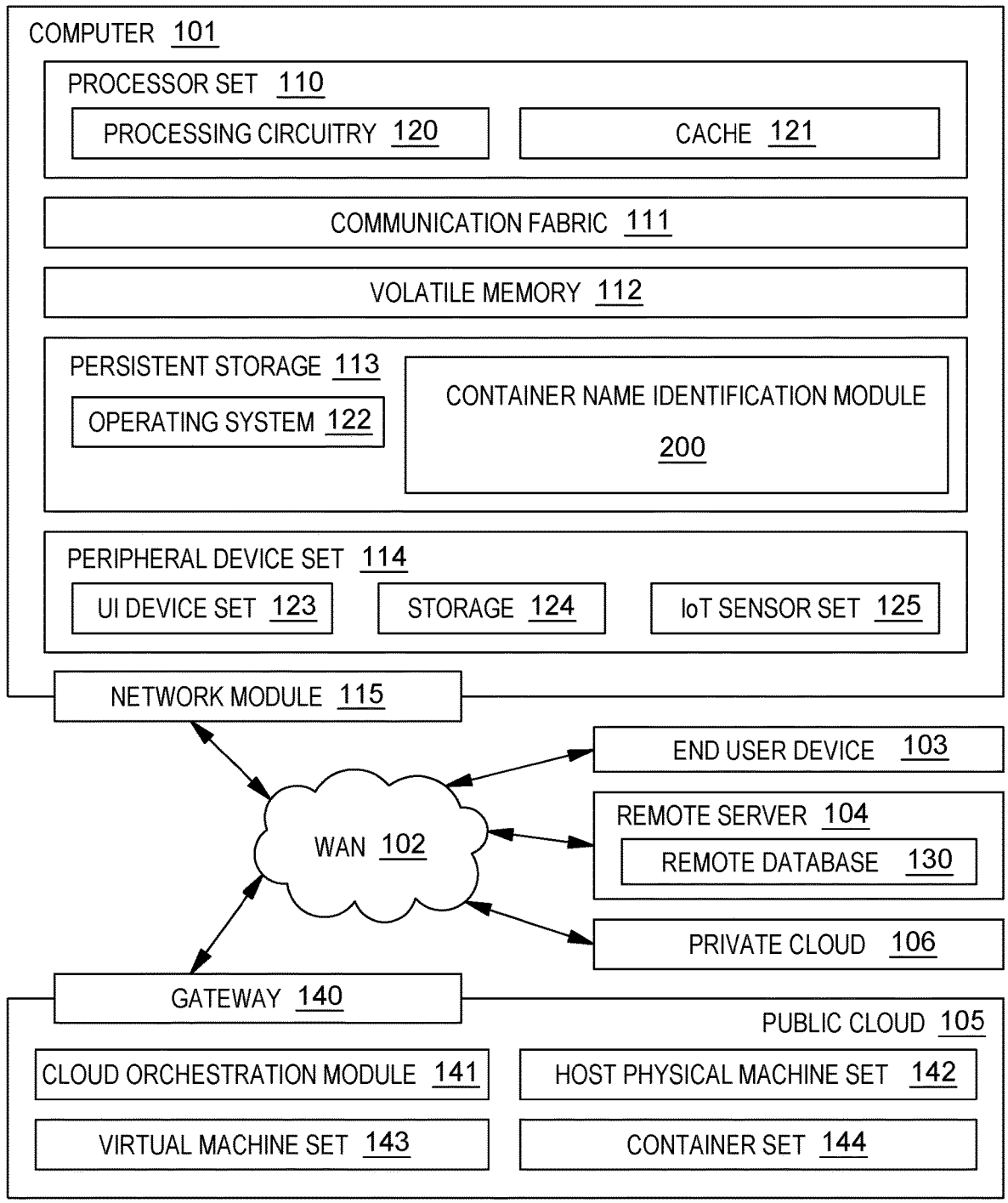
FIG. 1 depicts one example of a computing environment to include and/or use one or more aspects of the present invention.

As understood by one skilled in the art, program code, as referred to in this application, can include software and/or hardware. For example, program code in certain embodiments of the present invention can utilize a software-based implementation of the functions described, while other embodiments can include fixed function hardware. Certain embodiments combine both types of program code. Examples of program code, also referred to as one or more programs, are depicted in FIG. 1, including operating system 122 and container name identification module 200, which are stored in persistent storage 113.

One or more aspects of the present invention are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one processor or multiple processors, and/or any other type of environment and/or configuration, etc., that is capable of executing a process (or multiple processes) that, e.g., perform automated container name identification processing, such as disclosed herein. Aspects of the present invention are not limited to a particular architecture or environment.

Prior to further describing detailed embodiments of the present invention, an example of a computing environment to include and/or use one or more aspects of the present invention is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as container name identification module block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 126 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. Further, in one or more embodiments, one or more of the components/modules of FIG. 1 need not be included in the computing environment and/or are not used for one or more aspects of the present invention. Further, in one or more embodiments, additional and/or other components/modules can be used. Other variations are possible.

Figure 2:
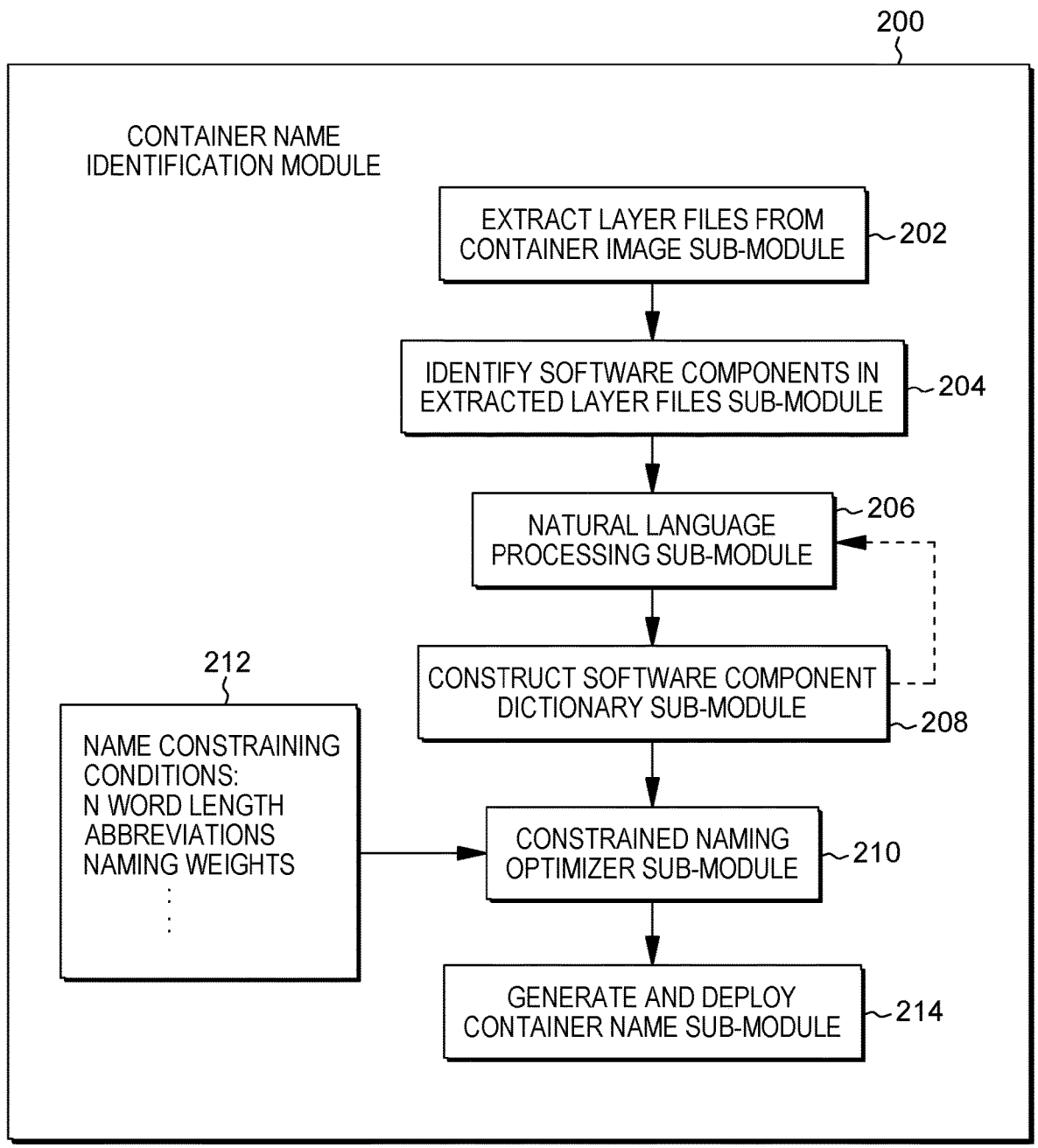
FIG. 2 depicts one embodiment of a computer program product with a container name identification module, in accordance with one or more aspects of the present invention.
Figure 3:
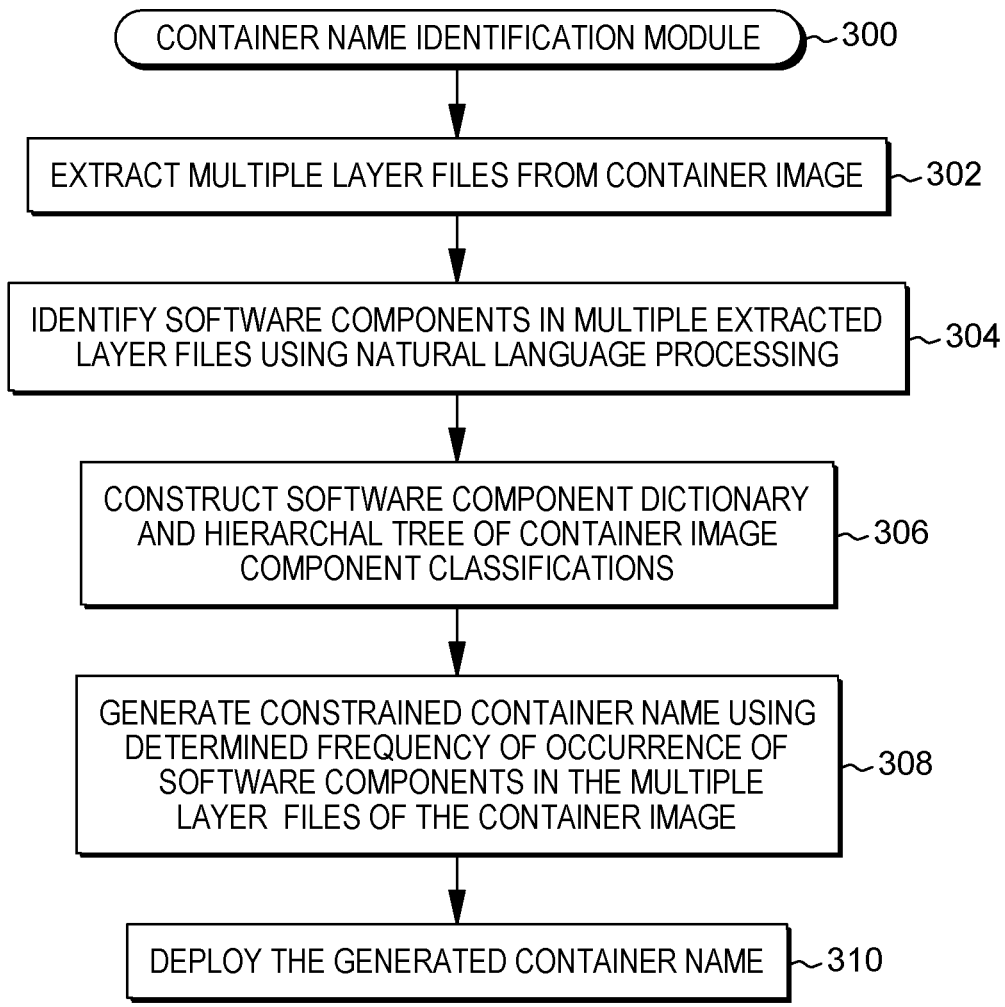
FIG. 3 depicts one embodiment of container name identification module processing, in accordance with one or more aspects of the present invention.

By way of example, one or more embodiments of a container name identification module are described initially with reference to FIGS. 2-3. FIG. 2 depicts further details of a container name identification module 200 that includes code or instructions used to perform container name identification module processing, in accordance with one or more aspects of the present invention, and FIG. 3 depicts one embodiment of a container name identification module process, in accordance with one or more aspects of the present invention.

Referring to FIGS. 1 & 2, container name identification module 200 includes, in one example, various sub-modules used to perform automated container name identification processing, in accordance with one or more aspects of the present invention. The sub-modules are, e.g., computer-readable program code (e.g., instructions) and computer-readable media (e.g., persistent storage (e.g., persistent storage 113, such as a disk) and/or a cache (e.g., cache 121), as examples). The computer-readable media can be part of a computer program product and can be executed by and/or using one or more computers, such as computer(s) 101; processors, such as a processor of processor set 110; and/or processing circuitry, such as processing circuitry of processor set 110, etc.

In the FIG. 2 embodiment, example sub-modules of container name identification module 200 include, for instance, an extract layer files from container image sub-module 202 to extract multiple layer files from the container image; an identify software components in extracted layer files sub-module 204 to identify software components in the extracted layer files; a natural language processing sub-module 206 to facilitate identifying the software components and generate a software component dictionary; a construct software component dictionary sub-module 208 to facilitate constructing the software component dictionary including, in one or more embodiments, a hierarchical tree of container image component classifications to facilitate generating a sequential set of labels for generating the container name, including optionally with version numbers and weights; a constrained naming-optimizer sub-module 210, which references one or more name-constraining conditions 212 to facilitate automated generating or deriving of a container name for the container using, for instance, the hierarchical tree and the determined frequency of occurrence of software components in the multiple layer files of the container image; and a generate and deploy container name sub-module 214 for generating the container name and providing the container name with, for instance, providing of the container for the container-based computing environment based on the container image. The generated container name is a digital identifier that facilitates processing within the container-based computing environment by being based, at least in part, on frequency of occurrence of software components in the multiple layer files of the container image. Note that although various sub-modules are described, automated container name identification module processing such as disclosed herein can use, or include, additional, fewer, and/or different sub-modules. A particular sub-module can include additional code, including code of other sub-modules, or less code. Further, additional and/or other modules can be used. Many variations are possible.

In one or more embodiments, the sub-modules are used, in accordance with one or more aspects of the present invention, to perform container name identification module processing. FIG. 3 depicts one example of an automated container name identification module process, such as disclosed herein. The process is executed, in one or more examples, by a computer (e.g., computer 101 (FIG. 1)), and/or a processor or processing circuitry (e.g., of processor set 110 of FIG. 1). In one example, code or instructions implementing the process, are part of a module, such as container name identification module 200. In other examples, the code can be included in one or more other modules and/or in one or more sub-modules of the one or more other modules. Various options are available.

As one example, container name identification module processing 300 executing on a computer (e.g., computer 101 of FIG. 1), a processor (e.g., a processor of processor set 110 of FIG. 1), and/or processing circuitry (e.g., processing circuitry of processor set 110), extracts multiple layer files from the container image 302, and identifies software components in the multiple extracted layer files using natural language processing 304. In one or more embodiments, a software component dictionary is constructed, along with a hierarchical tree of container image component classifications 306. A constrained container name is generated, in one or more embodiments, using determined frequency of occurrence of software components in the multiple layer files of the container image 308, and the generated container name is deployed 310, for instance, in association with providing the container from the container image for the container-based computing environment.

As further background, containerization is the packaging of software code, for instance, to implement a service or a microservice, with its dependencies, such as operating system libraries and/or other dependencies, used to run the software code to create a single, lightweight executable, referred to as a container. The container is portable in that it runs consistently and reliably on any information technology (IT) infrastructure. In one or more embodiments, the software code can be an application, such as a service instance, or a microservice instance. A container is created from a container image, which is a static file that includes executable program code that can be run as an isolated process on a computing or information technology (IT) infrastructure. One image can used to run one or more containers, which are runtime instances of the container image. Containers are lightweight (e.g., they share the machine's operating system), efficient, easy to manage, secure, and portable.

A variety of commercially available products exist for providing and managing containers, including open source systems for automating deployment, scaling, and management of containerized applications. In operation, the available product can orchestrate a containerized application to run on a cluster of hosts (or nodes), and automates deployment and management of cloud-native applications using on-premise infrastructure or public cloud platforms. These systems are designed to run containerized applications across a cluster of nodes (or servers or devices), which can be at a single geographic location or distributed across multiple geographic locations. In one or more implementations, a cluster is a set of nodes (whether physical computing resources or virtual computing resources) running a container agent, managed by a container orchestration control plane.

Container orchestration is the automation of much of the operational effort required to generate and run containerized workloads and services. Orchestration includes a wide range of processes required to maintain a container's lifecycle, including provisioning, deployment, scaling (up and down), networking, load balancing, and more. Note that there are a variety of orchestration platforms commercially available that can be used to manage, for instance, containers and the applications, services, microservices, etc., running therein.

Figure 4:
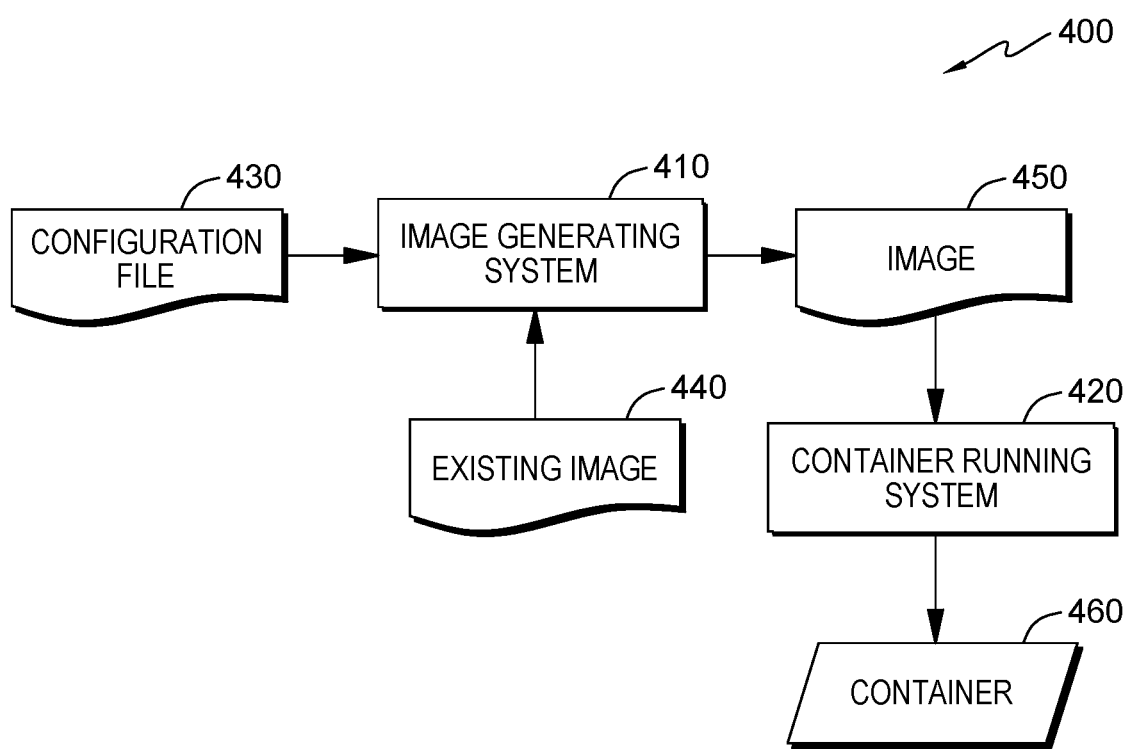
FIG. 4 depicts one embodiment of a container image workflow, in accordance with one or more aspects of the present invention.

FIG. 4 illustrates a computing environment 400 in association with one or more embodiments of the present invention can be implemented. Note that the structure and function of computing environment 400 are described only for purpose of illustration without suggesting any limitations as to the scope of the present invention. Embodiments of the present invention can be embodied, in one or more implementations, with a different environment and/or functionality.

As illustrated in FIG. 4, environment 400 can generally include an image-generating system 410 and a container-running system 420. The image-generating system 410 and/or container-running system 420 can be implemented by, or executing on, a computer, such as computer 101 of computing environment 100 of FIG. 1, by way of example. Certain embodiments of the present invention can include or be used in association with two phases, that is, an image-generating phase and a container-running phase.

During the image-generating phase, the image-generating system 410 generates, in one embodiment, an image 450 based on a configuration file 430 and an existing image 440. In one or more implementations, an image can be built from a base image using a set of instructions or layer files. The base image can be contained in the existing image 440, and the these instructions can be stored in the configuration file 430. For instance, the configuration file 430 can be a text-based script that contains instructions for generating image 450. The image-generating system 410 can read the configuration file 430 when the generation of image 450 is requested, execute the instructions, and return the generated image 450.

Specifically, each of the instructions in configuration file 430 can be executed step-by-step. In execution of the instructions, an intermediate container can be created so that the instruction is run inside the intermediate container. In this way, the intermediate container can contain all changes that need to be made to the underlying layers. Then, a copy of the intermediate container can be committed to as an image. After the instructions have been executed, all of the intermediate container can be removed and the image 450 will be left. During the container-running phase, the container-running system 420 can be configured to read image 450 to run a container 460.

In one or more implementations, one or more of the instructions stored in the configuration file 430 can create a layer file in the image 450. Image 450 can contain multiple layer files which define the container image. Within the multiple layer files, a variety of software components can be included, and repeated.

In one or more embodiments, automatic container naming can occur when a container is to be generated and deployed from a container image. In practice, the container name typically does not reflect the software components in the layer files of the container image, making it difficult to ascertain details about the content of the container from the generated container name.

Advantageously, disclosed herein are intelligent and automatic container name identification processes with naming conventions based on contents of the image layers being used. Container-naming is standardized with the name identification processes disclosed, and a computing system and/or end user can clearly know the main content of a container according to the container name identification process and naming conventions employed.

By way of example, embodiments of the present invention include computer-implemented methods, computer systems and computer program products, where program code executing on one or more processors facilitates processing within a container-based computing environment by standardizing container identification processing to provide a consistent, direct and intuitive automated process for intelligent container-naming, with naming conventions based on content of the container image layers. The process includes, for a container being provided from a container image: extracting multiple layer files from the container image; using natural language processing to determine frequency of occurrence of software components in the multiple layer files of the container image; and generating a container name for the container using the determined frequency of occurrence of software components in the multiple layer files of the container image. The program code executing on the one or more processors further provides the container for the container-based component environment using the container image and the generated container name. The generated container name is a digital identifier that facilitates processing within the container-based computing environment by being based, at least in part, on the frequency of occurrence of software components in the multiple layer files of the container image. In this manner, an intelligent and automatic container-naming process with naming conventions is provided based on contents of the image layer. The processes disclosed herein standardize, in one or more embodiments, the container-naming process, and the computing environment, as well as an end user, can identify the main content of the container according to the naming conventions utilized.

In one or more embodiments, generating the container name includes generating the container name in accordance with one or more name-constraining conditions. The one or more name-constraining conditions can include one or more of a length limitation for the container name being generated, an indication of whether abbreviations for the software components are to be used in the container name, an indication of whether naming weights for the software components are to be used in generating the container name, where (in one or more embodiments) the naming weights can be derived, at least in part, from the determined frequency of occurrence of the software components in the multiple layer files of the container image, and/or an indication of whether software component version numbers, if any, are to be used in the container name.

In one or more further embodiments, using natural language processing to determine frequency of occurrence of software components in the multiple layer files of the container image includes generating a hierarchical tree of container image component classifications which includes a set of software component names with corresponding weights. The corresponding weights are derived, at least in part, from the determined frequency of occurrence of the software components in the multiple layer files of the container image. Further, in one or more embodiments, using natural language processing to determine frequency of occurrence of software component names in the multiple layer files of the container image includes training and using a machine learning model to generate the hierarchical tree of container image component classifications, which includes the set of software component names with corresponding weights.

In one or more implementations, the standardized container identification processing disclosed herein includes, for instance, generating a special software dictionary and a special hierarchical tree for image content classification. In one embodiment, the software dictionary is constructed with data representative of frequency of occurrence of each unique software component within the multiple extracted layers using, for instance, container image scanning to scan the software components, operation systems, and other image components, in each of the multiple extracted layers. The hierarchical tree for image classification is provided to facilitate generating a sequential set of labels for the naming scheme, with version numbers, in one or more embodiments. In one implementation, a natural language processing (NLP) named-entity recognition module is provided for identifying names of software components in each of the multiple extracted layers for generating the software dictionary. Further, an automated naming optimization module is provided for implementing a constrained optimization naming protocol based on one or more name-constraining conditions, such as word length for the container name being generated, the software dictionary reference, abbreviation conventions, naming weights, etc.

Figure 5:
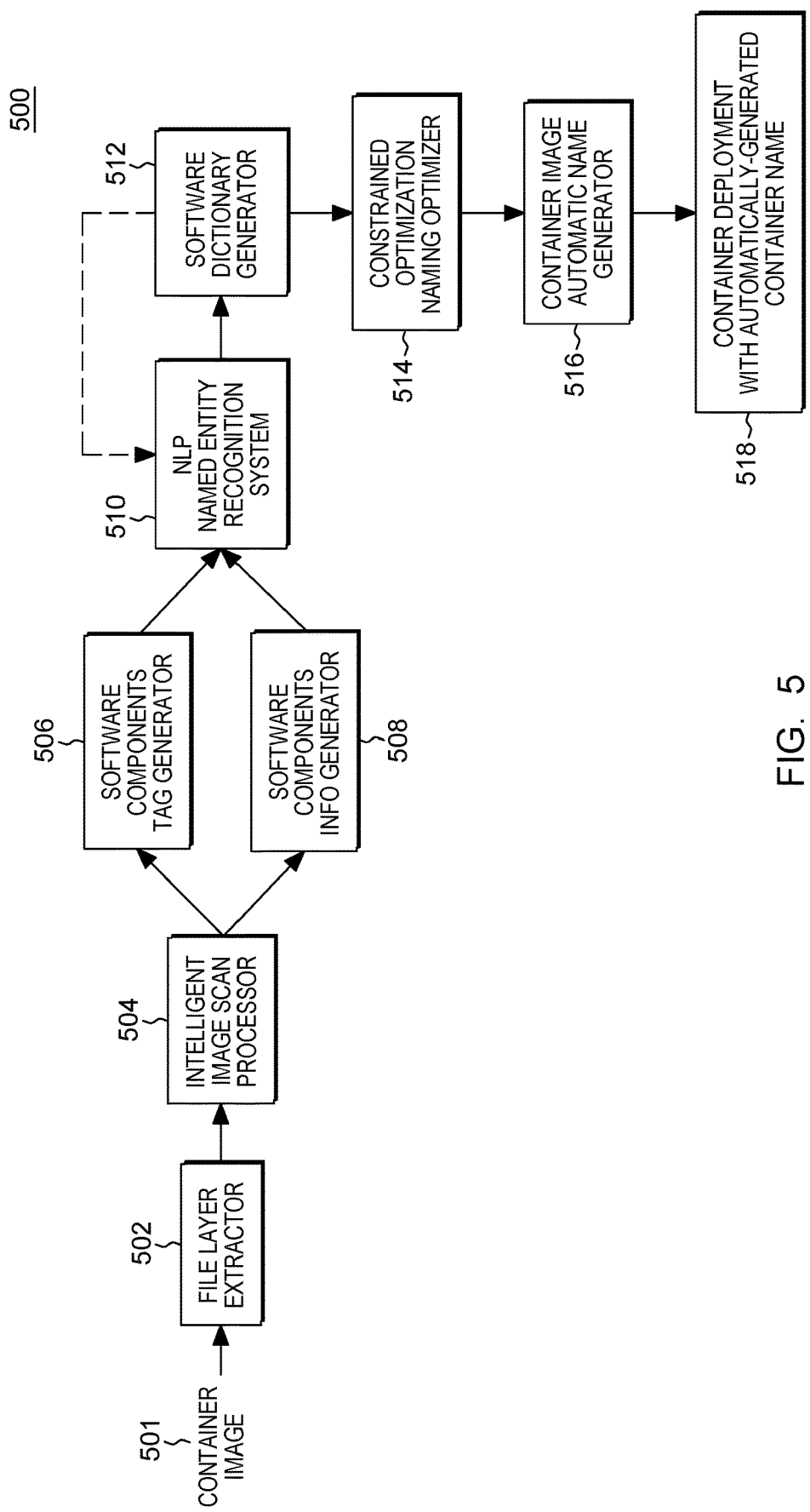
FIG. 5 depicts another example of a computing environment including and/or using one or more aspects of the present invention.

By way of example, FIG. 5 depicts another embodiment of a computing environment 500, which in one or more embodiments, can include, or execute on, one or more aspects of computing environment 100 of FIG. 1. In FIG. 5, computing environment 500 receives a container image 501 to be used in generating a container for which a container name is to be generated, using standardized container identification processing such as disclosed herein. Computing environment 500 includes a file layer extractor 502 to extract multiple layer files from container image 501, and an intelligent image scan processor 504 to identify the software components in the multiple extracted layer files using an intelligent image scan process. Computing environment 500 further includes a software components tag generator 506 and a software components information generator 508 to generate, for instance, a name tag and software component details and/or version information for each component, an example of which is depicted in FIG. 7A, and described further below. The generated software component tags and information are provided to a natural language processing (NLP) named-entity recognition system 510, which together with a software dictionary generator 512, generates a software dictionary from which a special hierarchical tree for image classification can be generated to obtain a sequential set of labels naming scheme and version numbers. A constrained naming optimizer 514 considers one or more name-constraining conditions, such as described herein. Container image automatic name generator 516 generates the appropriate container name based on the standardized container identification process (such as disclosed herein) with the container being deployed along with the automatically-generated container name 518. Further details of computing environment 500 processing are described below with reference to FIGS. 6A-9, by way of example only.

Figure 6A:
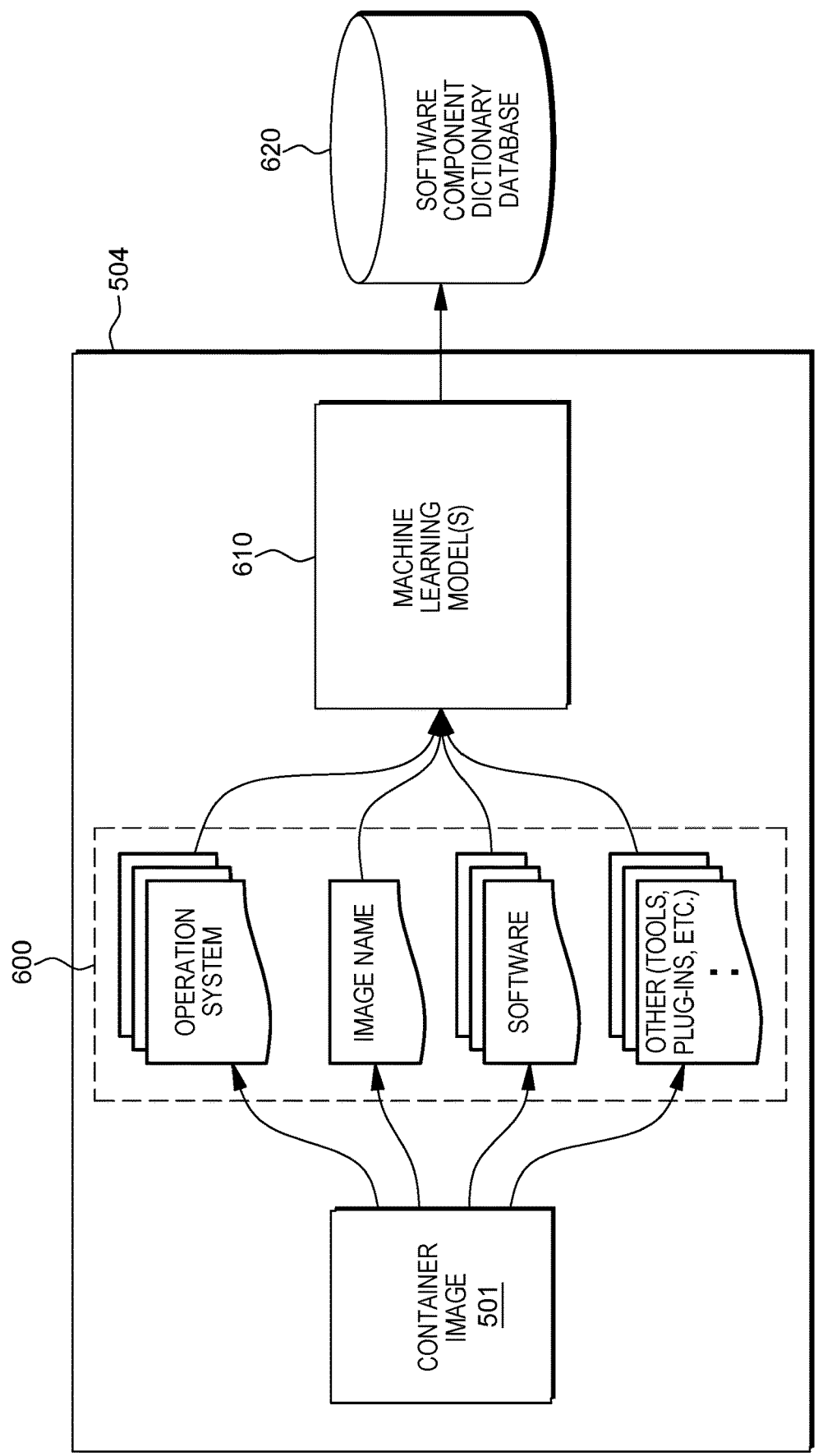
FIG. 6A depicts another example of a computing environment to facilitate extracting multiple layer files from a container image for identifying software components within the layer files, in accordance with one or more aspects of the present invention.
Figure 7A:
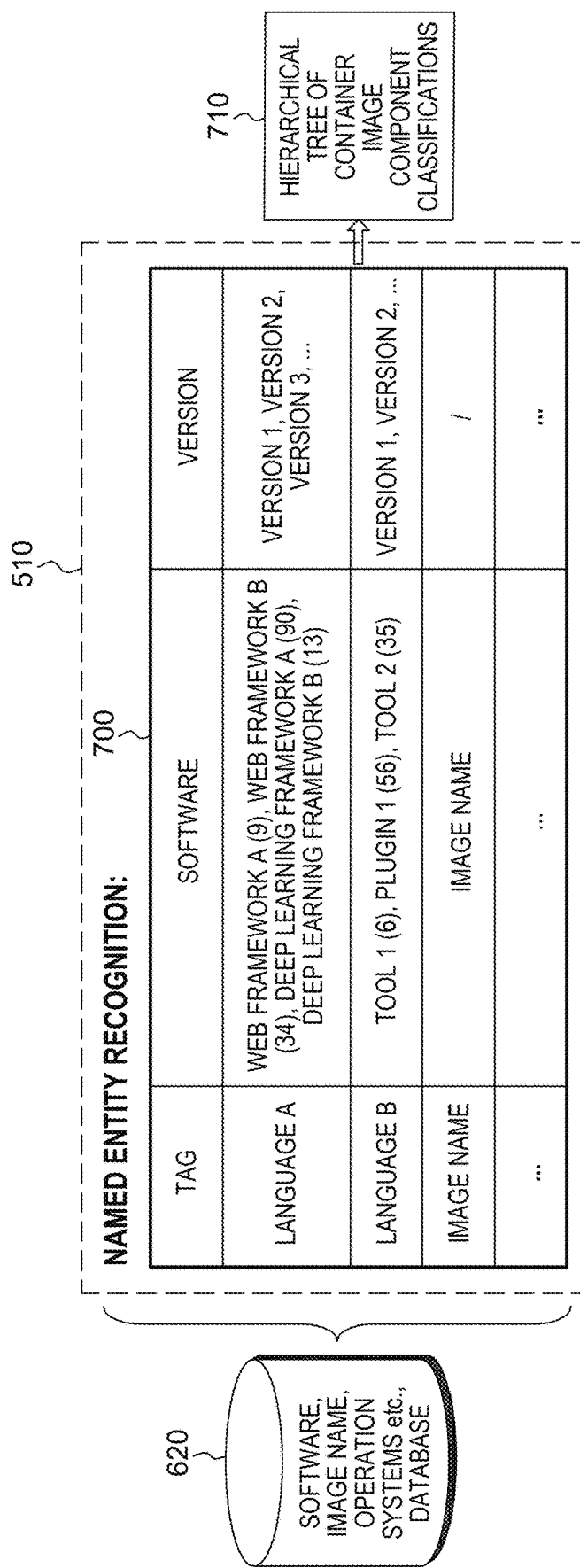
FIGS. 7A-7B depict another example of a container name identification workflow and hierarchical tree of container image component classifications, in accordance with one or more aspects of the present invention.

FIG. 6A depicts further details of one embodiment of an intelligent image scan processor 504, where container image 501 has had file layers extracted to obtain software components 600 including, by way of example, one or more operation system names, one or more software names, one or more image names, one or more tool names, plug-in names, etc. These software components are scanned, in one embodiment, via one or more machine learning models 610 trained to facilitate generating a software component dictionary of name tags, version numbers, and occurrence numbers, which is stored in one or more databases 620. In one or more embodiments, machine learning model 610 can include natural language processing to facilitate identifying the software component names 600 extracted from the layer files of container image 501.

Figure 6B:
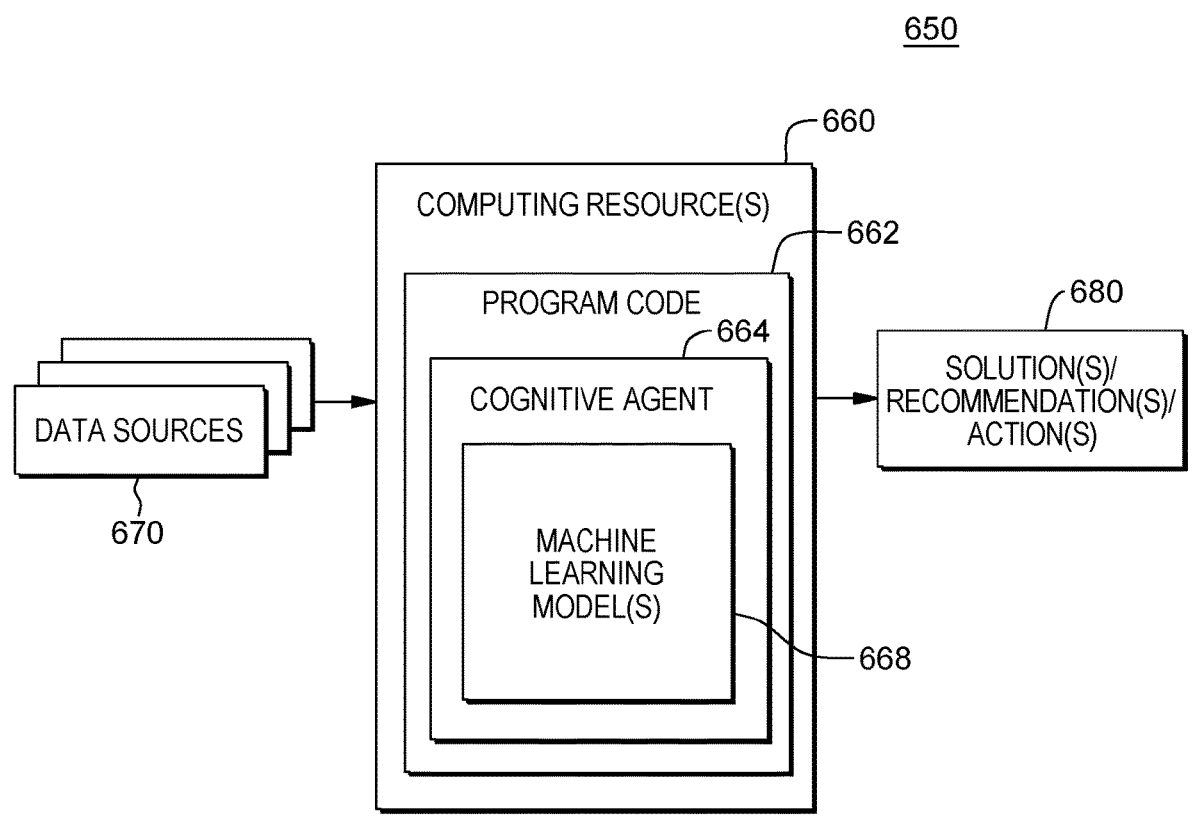
FIG. 6B is a further example of a computing environment to include and/or use one or more aspects of the present invention.

Before further describing one or more embodiments of the container name identification processing of the present invention, FIG. 6B depicts another embodiment of a computing environment or system 650, which can incorporate, or implement, one or more aspects of an embodiment of the present invention. In one or more implementations, system 650 is implemented as part of a computing environment, such as computing environment 100 described above in connection with FIG. 1. System 650 includes one or more computing resources 660 that execute program code 662 that implements, for instance, one or more aspects of a container name identification module or facility, and which includes a cognitive engine or agent 664, which utilizes one or more machine learning models 668, such as described herein. Data, such as the container image layer files and software component data discussed herein, is used by cognitive agent 664, to train model(s) 668 to (for instance) facilitate standardized container identification processing, and to generate one or more name recommendations and/or name-related actions 680, etc., based on the particular application of the machine-learning model to facilitate achieving the container name identification process. In implementation, system 650 can include, or utilize, one or more networks for interfacing various aspects of computing resource(s) 660, as well as one or more data sources 670 providing data, and one or more systems receiving a name output, action, etc., 680 of machine learning model(s) 668. By way of example, the network(s) can be, for instance, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of receiving and transmitting data, including training data for the machine-learning model, and an output solution, recommendation, action, of the machine-learning model, such as discussed herein.

In one or more implementations, computing resource(s) 660 house and/or execute program code 662 configured to perform methods in accordance with one or more aspects of the present invention. By way of example, computing resource(s) 660 can be a computing-system-implemented resource(s). Further, for illustrative purposes only, computing resource(s) 660 in FIG. 6B is depicted as being a single computing resource. This is a non-limiting example of an implementation. In one or more other implementations, computing resource(s) 660, by which one or more aspects of machine-learning-based container identification processing, such as discussed herein is implemented, can, at least in part, be implemented in multiple separate computing resources or systems, such as one or more computing resources of a cloud-hosting environment, by way of example.

Briefly described, in one embodiment, computing resource(s) 660 can include one or more processors, for instance, central processing units (CPUs). Also, the processor(s) can include functional components used in the integration of program code, such as functional components to fetch program code from locations in such as cache or main memory, decode program code, and execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access, one or more other computing resources and/or databases, as required to implement the machine-learning processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the micro-channel architecture (MCA), the enhanced ISA (EISA), the Video Electronic Standard Association (VESA), local bus, and peripheral component interconnect (PCI). As noted, examples of a computing resource(s) or a computer system(s) which can implement one or more aspects disclosed are described further herein with reference to the figures.

In one embodiment, program code 662 executes, in one implementation, a cognitive engine or agent 664 which includes and trains one or more models 668. The models can be trained using training data that can include a variety of types of data, depending on the model and the data sources. In one or more embodiments, program code 662 executing on one or more computing resources 660 applies one or more algorithms of cognitive agent 664 to generate and train the model(s), which the program code then utilizes to identify, for instance, a software component name and/or weight associated therewith, and depending on the application, to perform an action (e.g., provide a name solution, make a name recommendation, perform a name-based task, etc.). In an initialization or learning stage, program code 662 trains one or more machine learning models 668 using obtained training data that can include, in one or more embodiments, container image layer files, software component dictionary data, etc., such as described herein.

Data used to train the model (in one or more embodiments of the present invention) can include a variety of types of data, such as heterogeneous data generated by one or more data sources and/or data stored in one or more databases, or accessible by, the computing resource(s). Program code, in embodiments of the present invention, can perform data analysis to generate data structures, including algorithms utilized by the program code to predict and/or perform an action. As known, machine-learning-based modeling solves problems that cannot be solved by numerical means alone. In one example, program code extracts features/attributes from training data, which can be stored in memory or one or more databases. The extracted features can be utilized to develop a predictor function, h(x), also referred to as a hypothesis, which the program code utilizes as a model. In identifying machine learning model(s) 668, various techniques can be used to select features (elements, patterns, attributes, etc.), including but not limited to, diffusion mapping, principal component analysis, recursive feature elimination (a brute force approach to selecting features), and/or a random forest, to select the attributes related to the particular model. Program code can utilize one or more algorithms to train the model(s) (e.g., the algorithms utilized by program code), including providing weights for conclusions, so that the program code can train any predictor or performance functions included in the model. The conclusions can be evaluated by a quality metric. By selecting a diverse set of training data, the program code trains the model to identify and weight various attributes (e.g., features, patterns) that correlate to enhanced performance of the model.

In one or more embodiments, program code, executing on one or more processors, utilizes an existing cognitive analysis tool or agent (now known or later developed) to tune the model, based on data obtained from one or more data sources. In one or more embodiments, the program code can interface with application programming interfaces to perform a cognitive analysis of obtained data. Specifically, in one or more embodiments, certain application programing interfaces include a cognitive agent (e.g., learning agent) that includes one or more programs, including, but not limited to, natural language classifiers, a retrieve-and-rank service that can surface the most relevant information from a collection of documents, concepts/visual insights, tradeoff analytics, document conversion, and/or relationship extraction. In an embodiment, one or more programs analyze the data obtained by the program code across various sources utilizing one or more of a natural language classifier, retrieve-and-rank application programming interfaces, and tradeoff analytics application programing interfaces.

In one or more embodiments of the present invention, the program code can utilize a neural network to analyze training data and/or collected data to generate an operational machine-learning model. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identified patterns in data. Because of the speed and efficiency of neural networks, especially when parsing multiple complex datasets, neural networks and deep learning provide solutions to many problems in multi-source processing, which program code, in embodiments of the present invention, can utilize in implementing a machine-learning model, such as described herein.

As noted, container name identification processing as disclosed herein includes extracting multiple layer files from a container image to be used to generate a container, and identifying software components in the multiple extracted layer files using, for instance, natural language processing (NLP). In one or more embodiments, a software component dictionary is constructed, along with a hierarchical tree of container image content classifications. One embodiment of this is depicted with reference to FIGS. 7A-7B.

Figure 7B:
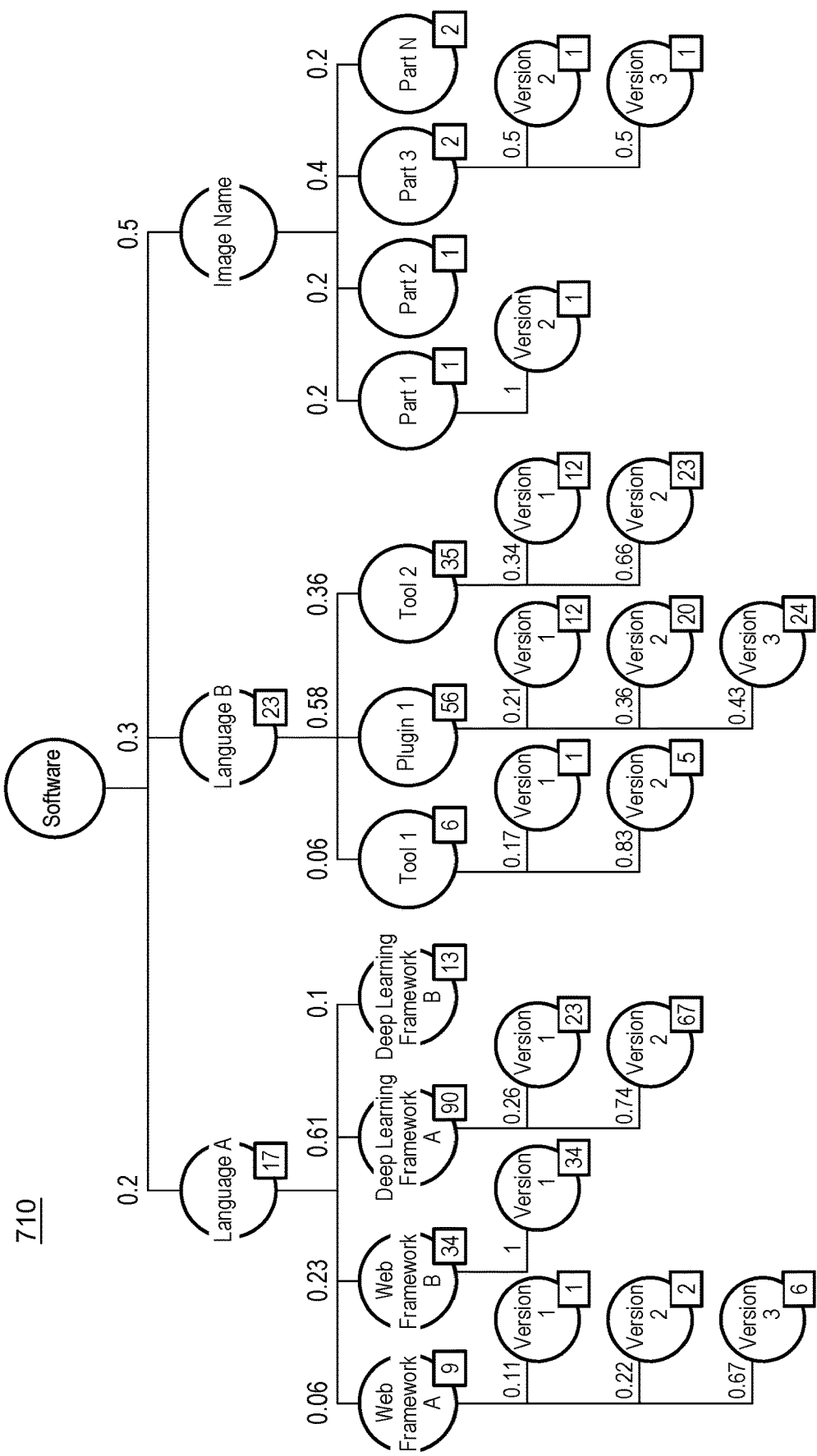

Referring to FIG. 7A, the software component dictionary can be generated using a machine learning model with natural language processing (NLP) to perform named-entity recognition 510 and evaluation of software components in the multiple extracted layer files of the container image. The multiple extracted layer files can include different software products, an image name, operation systems, tools, plug-ins, etc., which can be stored in a database 620. FIG. 7A depicts one embodiment of a data structure 700 instructed by the NLP named-entity recognition system 510, which identifies tags, and names and versions of software in the container image for generating the software dictionary. In one embodiment, the data structure 700 includes a tag or name of the software product, any software dependencies or components within the software, including number of occurrences of the software components within the container image (which are shown in parentheses in the figure), as well as a version number for the software components, in one or more embodiments. The software dictionary or data structure is used, in one or more embodiments, to generate a hierarchical tree of container image component classifications 710, one embodiment of which is depicted in FIG. 7B, by way of example only.

A special hierarchical tree can be provided to facilitate generating a sequential set of labels naming scheme and version numbers with weights. By way of example, the "language A" circle in FIG. 7B is a main tag, where the number 17 associated with it indicates its occurring times or frequency in the image layers of the container image. The number 0.2 indicates the weight that this total tag has. By default the "image name" can have a 0.5 weight value. In the example illustrated, the "image name" has a 0.5 weight value, and its components include "Part 1, Part 2, Part 3 . . . Part N", and they also have a weight associated with them. Additionally, "Part 1" and "Part 3" have different associated versions, which also have weight values. Note that, in one or more embodiments, weight values can be set by a user, or automatically by a machine-learning-based modeling (for instance, based on frequency of occurrence).

In one or more embodiments, under each tag, the hierarchical tree will include detailed software classifications. The number after each software component indicates its occurring times or frequency in the image layers. The number before each software node or circle indicates the weight each software component has, by way of example only. By default, the weight value is calculated through its specific frequency number divided by the total frequency values of components in the particular software layer. For instance, in one example, the weight calculation for "Web Framework A" under "Language A" layer would be 9 divided by 9+34+30+13, to arrive at a weight of 0.06, as indicated in FIG. 7B.

In general, in one or more embodiments, a priority weight can be defined as $w_{ijkl}$ . . . . Note that each layer can have a weight index, and the weight index in the first layer of a node will be $w_1$, $w_2$ . . . , and the second layer will be $w_{i1}$, $w_{i2}$ . . . . In one embodiment, the total weight for one component w can be defined as:

$$w = w_1 \cdot w_{12} \cdot w_{124} \cdot w_{1243},$$

where the weights of specific components will only be compared with the components in the same node layer. For instance, the final weight calculation for the "Deep Learning Framework A Version 2" of FIG. 7B would be determined as 0.2·0.61·0.74=0.09028.

By way of example, FIG. 8 depicts a special hierarchical tree data structure, with software component final weight calculation scores obtained such as described herein (as one example only).

Figure 9:
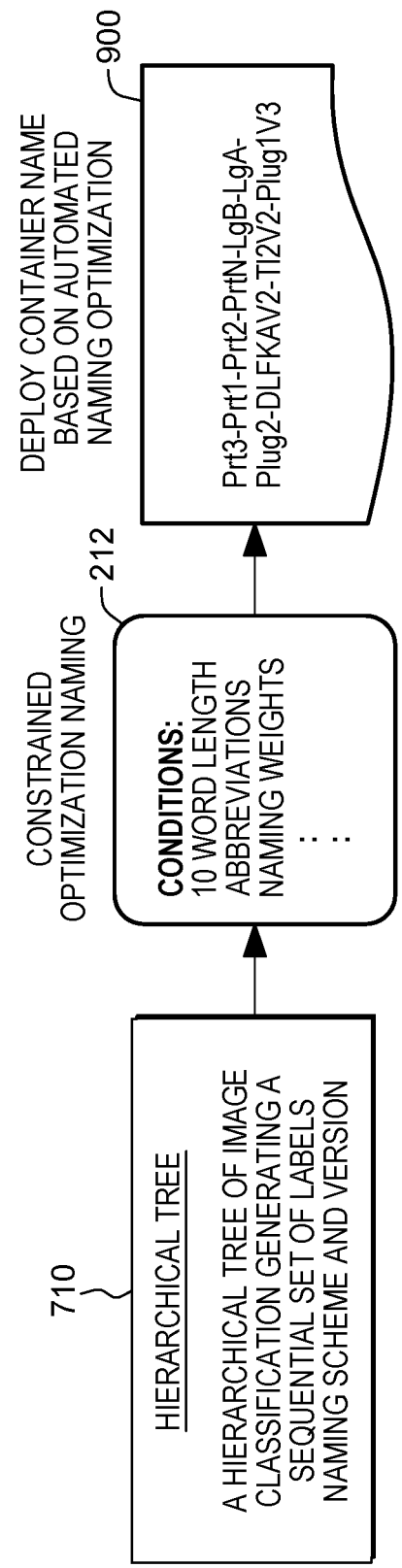
FIG. 9 is a further example of a container name identification workflow to generate a container name, in accordance with one or more aspects of the present invention.

As noted, in one or more embodiments, a constrained container name is generated using determined frequency of occurrence of software components in the multiple layers of the container image, and the generated container name is deployed, for instance, in association with providing the container from the container image for the container-based computing environment. An example of this is depicted in FIG. 9, where hierarchical tree 710 is obtained, with image content classification for generating a sequential set of labels naming scheme and version. The container name generation is constrained, in one or more implementations, by one or more name-constraining conditions 212, such as limiting the generated container name to ten words in length, using abbreviations as words, and using naming weights or scores in determining prioritization for including software component names in the ten-word component name length. In one or more embodiments, the one or more name-constraining conditions can be one or more user-set conditions, or conditions set by default. An example of a resultant name is illustrated in FIG. 9, with the container name being deployed based on the automated naming process and optimization 900 disclosed herein.

By way of further example, name optimization and automatic name generation by a naming optimization module can be implemented based on multiple name-constraining conditions. For example, in one embodiment, word name length may be set to three. In this case, existing components or items in classification level 1 of hierarchical tree 710 (FIG. 7B) include three, which can be identified as "IName", "LgA", "LgB". The abbreviations in this example can be obtained from the hierarchical tree data structure of FIG. 8 example. From the related parts scores in FIG. 8, the name "IName-LgB-LgA" is obtained, where abbreviations are enabled by default (in the example), and the container name component order being based on weights, with "IName" being weighted higher than "LgB", which is weighted higher than "LgA".

In another example, if a 10-word limitation is set, abbreviations are enabled by default, and versions are allowed, then the following name is obtained based on a calculated score comparison in the first stage:
"IName-LgB-LgA-Prt3-Plug2-DLFKA-T12-Prt1-Prt2-PrtN"
Here, due to all INames parts (Part1, Part2, Part3, and PartN) being included, the "IName" word can be removed, and all its related parts in the naming list are picked up and gathered as a current sequence in the current naming list, and replace the place of "IName" for name optimization. Then another three words from classification level 3 will be appended here, which have the highest score in the classification level 3 in the second stage for this 10-word limitation example as follows:
"Prt3-Prt1-Prt2-PrtN-LgB-LgA-Plug2-DLFKA-T12-DLFKAV2-Plug1V3-T12V2"
Then, due to the 3$^{rd}$ level part (DLFKAV2) of DLFKA and DLFKA are both included in the current naming list, and the 3$^{rd}$ level part (T12V2) of T12 and T1 are both included in the current naming list, the "DLFKA: and "T12V2" will be replaced by its 3$^{rd}$ level parts DLFKAv2 T12V2 separately for optimization. In one embodiment, the "naming optimizer" operation and the "automatic name generate" function are then finished, with the final name being as illustrated in FIG. 9:
"Prt3-Prt1-Prt2-PrtN-LgB-LgA-Plug2-DLFKAV2-T12V2-Plug1V3".

With the described hierarchical tree example, components of the container image are ordered per their final weight score sequence in their own layer, and the software component with the highest weight value will be preferentially placed in the front position of the container name. Moreover, a user can use a -w option to change an existing (or non-existing) component order to go to the first layer and have the highest weight. This -w option can consume a list, such as -w [DLFKC, ubuntu], or just -w [DLFKC]. For instance, a user can use the option to set the user's own naming weights using podman:
podman run -it -w DLFramework1-max1 10<image ID>.
In this way, the container name will be as follows:
DLFKC-Prt3-Prt1-Prt2-PrtN-LgB-LgA-Plug2-DLFKAV2-T12V2.
The user can use -abbr option to use the abbreviated format of the software names, and also use -max1 option to set the max software name, that can be used in the container naming. Additionally, a -noversion option can be used to remove the version of the related software in the name as follows:
podman run -it -w[DLFKC, Tool5]-abbr -max1 11 -noversion <image ID>,
In this way, the container name will be as follows:
DLFKS-T15-Prt3-Prt1-Prt2-PrtN-LgB-LgA-DLFKA-T12.

By way of further example, three containers can be automatically created for debugging and testing by extracting from the container image via intelligent image scan processing the layer files, and then applying natural language processing (NPL) named-entity recognition modeling for identifying software components to generate a software dictionary and the special hierarchical tree, as described herein. The special hierarchical tree for image classification is provided to generate a sequential list of labels naming scheme and version, in one or more embodiments.

In one example, an automated naming optimization module uses the constrained optimization naming optimizer to generate the container name meeting the following constraints, with the image name itself also having a naming weight:
3 words length
abbreviation conventions
naming weight
:
:
Then, the containers are generated (for instance, based on the above method), and depending on whether abbreviations are to be used, the automatically-named containers will be as follows:
podman run -it -w DeepLearningFrameworkA -abbr -max1 2<image ID>
DLFWA-Prt3
podman run -it -w DeepLearningFrameworkA -max1 3<image ID>
DeepLearningFrameworkA-Part3-Part1.

Those skilled in the art will note that container name identification processing disclosed herein standardizes the naming process and generates a container name for a container using frequency of occurrence of software components in the multiple layer files of the container image. During the process, a special software dictionary is constructed, which measures frequency of occurrence of each unique software components across the multiple extracted layers via image scanning, including scanning the software, operation systems, and other components of the multiple extracted layers. A special hierarchical tree for image classification is established to facilitate generating a sequential set of labels naming scheme and version, as described herein. Further, the process utilizes a natural language processing (NLP) named-entity recognition process or module for identifying software in each of the multiple extracted layers of the generated software dictionary. The automated naming optimization module facilitates constrained optimization naming of the container for one or more name-constraining conditions, such as a word length limitation, a software dictionary reference, whether abbreviations are to be used, and if so, abbreviation conventions, naming weights, etc. Advantageously, the container name identification processing disclosed herein provides a standardized process for naming convention based on the container image content. According to the naming conventions, an end user or end process or system can understand content of the deployed container. Further, the standardized container name identification process disclosed is beneficial to troubleshooting, problem analysis, and impact evaluation, which facilitates processing within the container-based computing environment. This makes container and container image maintenance more efficient, and standardizes container name identification processing.

Other aspects, variations and/or embodiments are possible.

The computing environments described herein are only examples of computing environments that can be used. Other environments may be used; embodiments are not limited to any one environment. Although various examples of computing environments are described herein, one or more aspects of the present invention may be used with many types of environments. The computing environments provided herein are only examples.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other types of neural networks may be considered. Further, other scenarios may be contemplated. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A container-based computing environment method comprising:
    training a machine learning component recognition model to identify software components extracted from layer files of container images;
    generating, within the container-based computing environment, an executable container from a container image, the executable container implementing a computing service, and the generating comprising:
        extracting multiple layer files from the container image via intelligent image scan processing of layer files of the container image;
        determining, via natural language processing and the of a trained machine learning component recognition model, frequency of occurrence of software components in the multiple layer files of the container image;
        using the determined frequency of occurrence of software components in the multiple layer files of the container image in generating a digital identifier for the executable container that reflects, at least in part, the software components in the multiple layer files of the container image and reflects, at least in part, a component ordering based on a weight score sequence of the software components;
        generating, from the container image, the executable container and linking within the container-based computing environment the generated digital identifier to the executable container; and
    deploying the executable container within the container-based computing environment with the generated digital identifier, wherein problem analysis of the executable container is facilitated within the container-based computing environment via the linked digital identifier being based, at least in part, on the frequency of software components in the multiple layer files of the container image from which the executable container is generated.

2. The container-based computing environment method of claim 1, wherein generating the digital identifier further includes generating the digital identifier in accordance with one or more name-constraining conditions.

3. The container-based computing environment method of claim 2, wherein the one or more name-constraining conditions include a length limitation for the digital identifier being generated.

4. The container-based computing environment method of claim 2, wherein the one or more name-constraining conditions include an indication whether abbreviations for software component names are to be used in the digital identifier.

5. The container-based computing environment method of claim 2, wherein the one or more name-constraining conditions include an indication of whether software component versions numbers, if any, are to be used in the digital identifier.

6. The container-based computing environment method of claim 2, wherein the one or more name-constraining conditions include an indication of whether naming weights for the software components are to be used in generating the digital identifier, the naming weights being derived, at least in part, from the determined frequency of occurrence of the software components in the multiple layer files of the container image.

7. The container-based computing environment method of 1, wherein generating the digital identifier further comprises generating the digital identifier in accordance with multiple name-constraining conditions, the multiple name-constraining conditions include a length limitation for the digital identifier being generated, an indication of whether abbreviations for software component names are to be used in the digital identifier, an indication of whether software component version numbers, if any, are to be used in the digital identifier, and an indication of whether naming weights for the software components are to be used in generating the digital identifier, the naming weights being derived, at least in part, from the determined frequency of occurrence of the software components in the multiple layer files of the container image.

8. The container-based computing environment method of claim 1, wherein using natural language processing to determine frequency of occurrence of software components in the multiple layer files of the container image comprises generating a hierarchical tree of container image component classifications which includes a set of software component names with corresponding weights, the corresponding weights being derived, at least in part, from the determined frequency of occurrence of the software components in the multiple layer files of the container image.

9. The container-based computing environment method of claim 8, wherein determining, by natural language processing using the trained machine learning component recognition model, frequency of occurrence of software components in the multiple layer files of the container image comprises training the machine learning model to generate the hierarchical tree of container image component classifications which includes the set of software component names with corresponding weights.

10. A computer system for facilitating processing within a container-based computing environment, the computer system comprising:

a memory; and
at least one processor in communication with the memory, wherein the computer system is configured to perform a method, the method comprising:
training a machine learning component recognition model to identify software components extracted from layer files of container images;
generating, within the container-based computing environment, an executable container from a container image, the executable container implementing a computing service, and the generating comprising:
extracting multiple layer files from the container image via intelligent image scan processing of layer files of the container image;
determining, via natural language processing and the trained machine learning component recognition model, frequency of occurrence of software components in the multiple layer files of the container image;
using the determined frequency of occurrence of software components in the multiple layer files of the container image in generating a digital identifier for the executable container that reflects, at least in part, the software components in the multiple layer files of the container image and reflects, at least in part, a component ordering based on a weight score sequence of the software components;
generating, from the container image, the executable container and linking within the container-based computing environment the generated digital identifier to the executable container; and
deploying the executable container within the container-based computing environment with the generated digital identifier, wherein problem analysis of the executable container is facilitated within the container-based computing environment via the linked digital identifier being based, at least in part, on the frequency of software components in the multiple layer files of the container image from which the executable container is generated.

11. The computer system of claim 10, wherein generating the digital identifier further includes generating the digital identifier in accordance with one or more name-constraining conditions.

12. The computer system of claim 11, wherein the one or more name-constraining conditions are selected from the group consisting of a length limitation for the digital identifier being generated, an indication of whether abbreviations for software component names are to be used in the digital identifier, an indication of whether software component version numbers, if any, are to be used in the digital identifier, and an indication of whether naming weights for the software components are to be used in generating the digital identifier, the naming weights being derived, at least in part, from the determined frequency of occurrence of the software components in the multiple layer files of the container image.

13. The computer system of claim 10, wherein generating the digital identifier further comprises generating the digital identifier in accordance with multiple name-constraining conditions, the multiple name-constraining conditions include a length limitation for the digital identifier being generated, an indication of whether abbreviations for software component names are to be used in the digital identifier, an indication of whether software component version numbers, if any, are to be used in the digital identifier, and an indication of whether naming weights for the software components are to be used in generating the digital identifier, the naming weights being derived, at least in part, from the determined frequency of occurrence of the software components in the multiple layer files of the container image.

14. The computer system of claim 10, wherein using natural language processing to determine frequency of occurrence of software components in the multiple layer files of the container image comprises generating a hierarchical tree of container image component classifications which includes a set of software component names with corresponding weights, the corresponding weights being derived, at least in part, from the determined frequency of occurrence of the software components in the multiple layer files of the container image.

15. The computer system of claim 14, wherein determining, by natural language processing using the trained machine learning component recognition model, frequency of occurrence of software components in the multiple layer files of the container image comprises training the machine learning model to generate the hierarchical tree of container image component classifications which includes the set of software component names with corresponding weights.

16. A computer program product for facilitating processing within a container-based computing environment, the computer program product comprising:
one or more computer-readable storage media and program instructions collectively stored on the one or more computer-readable storage media readable by at least one processing circuit to perform a method comprising:
training a machine learning component recognition model to identify software components extracted from layer files of container images;
generating, within the container-based computing environment, an executable container from a container image, the executable container implementing a computing service, and the generating comprising:
extracting multiple layer files from the container image via intelligent image scan processing of layer files of the container image;
determining, via natural language processing and the of a trained machine learning component recognition model, frequency of occurrence of software components in the multiple layer files of the container image;
using the determined frequency of occurrence of software components in the multiple layer files of the container image in generating a digital identifier for the executable container that reflects, at least in part, the software components in the multiple layer files of the container image and reflects, at least in part, a component ordering based on a weight score sequence of the software components is content derived;
generating, from the container image, the executable container and linking within the container-based computing environment the generated digital identifier to the executable container; and
deploying the executable container within the container-based computing environment with the generated digital identifier, wherein problem analysis of the executable container is facilitated within the container-based computing environment via the linked digital identifier being based, at least in part, on the frequency of software components in the multiple layer files of the container image from which the executable container is generated.

17. The computer program product of claim 16, wherein generating the digital identifier further includes generating the digital identifier in accordance with one or more name-constraining conditions.

18. The computer program product of claim 17, wherein the one or more name-constraining conditions are selected from the group consisting of a length limitation for the digital identifier being generated, an indication of whether abbreviations for software component names are to be used in the digital identifier, an indication of whether software component version numbers, if any, are to be used in the digital identifier, and an indication of whether naming weights for the software components are to be used in generating the digital identifier, the naming weights being derived, at least in part, from the determined frequency of occurrence of the software components in the multiple layer files of the container image.

19. The computer program product of claim 16, wherein using natural language processing to determine frequency of occurrence of software components in the multiple layer files of the container image comprises generating a hierarchical tree of container image component classifications which includes a set of software component names with corresponding weights, the corresponding weights being derived, at least in part, from the determined frequency of occurrence of the software components in the multiple layer files of the container image.

20. The computer program product of claim 19, wherein determining, by natural language processing using the trained machine learning component recognition model, frequency of occurrence of software components in the multiple layer files of the container image comprises training the machine learning model to generate the hierarchical tree of container image component classifications which includes the set of software component names with corresponding weights.

* * * * *